United States Patent [19]

Fox

[11] Patent Number: 4,937,417

[45] Date of Patent: Jun. 26, 1990

[54] METAL SPRAYING APPARATUS

[75] Inventor: Thomas J. Fox, Virginia Beach, Va.

[73] Assignee: Douglas Call, Jr., Newport News, Va.

[21] Appl. No.: 372,130

[22] Filed: Jun. 27, 1989

Related U.S. Application Data

[63] Continuation of PCT US88/02140 filed Jun. 24, 1988, which is a continuation-in-part of Ser. No. 66,173, Jun. 25, 1987, abandoned.

[51] Int. Cl.$^{5}$ .................................................. B23K 9/04

[52] U.S. Cl. ................................ 219/76.1; 219/76.14; 219/137.62

[58] Field of Search .................. 219/76.1, 76.14, 76.16, 219/137.62, 137.9; 174/15 WF; 239/81–84

[56] References Cited

U.S. PATENT DOCUMENTS

| | | | |
|---|---|---|---|
| 2,040,030 | 5/1936 | Snyder et al. | 83/91 |
| 2,196,647 | 4/1940 | Snyder et al. . | |
| 2,749,176 | 6/1956 | Steyer | 299/28.8 |
| 2,861,900 | 11/1958 | Smith et al. | 117/105 |
| 2,876,330 | 3/1959 | Reinhardt . | |
| 3,141,616 | 7/1964 | Cauchetier | 239/81 |
| 3,312,566 | 4/1967 | Winzeler et al. . | |
| 3,333,044 | 7/1967 | Toto . | |
| 3,349,346 | 9/1967 | Toto . | |
| 3,546,415 | 12/1970 | Marantz . | |
| 3,632,952 | 7/1970 | Rotolico . | |
| 3,798,411 | 3/1974 | Wagner . | |
| 4,024,369 | 5/1977 | Thompson et al. . | |
| 4,088,866 | 5/1978 | Lund et al. | 219/137 R |
| 4,095,081 | 6/1978 | Ashman . | |
| 4,140,892 | 2/1979 | Muller . | |
| 4,356,917 | 11/1982 | Ashman . | |
| 4,492,337 | 1/1985 | Harrington et al. . | |
| 4,508,951 | 4/1985 | Rehrig | 219/137.62 X |
| 4,512,513 | 4/1985 | Rogers | 219/76.14 X |
| 4,568,019 | 2/1986 | Browning . | |
| 4,593,856 | 6/1986 | Browning . | |
| 4,618,504 | 10/1986 | Bosna et al. . | |
| 4,626,476 | 12/1986 | Londry et al. . | |
| 4,634,611 | 1/1987 | Browning . | |
| 4,668,852 | 5/1987 | Fox . | |

FOREIGN PATENT DOCUMENTS

| | | | |
|---|---|---|---|
| 543205 | 12/1955 | Belgium | 219/76.14 |
| 119618 | 9/1947 | Sweden . | |

*Primary Examiner*—Gerald P. Tolin
*Assistant Examiner*—Lincoln Donovan
*Attorney, Agent, or Firm*—Beveridge, DeGrandi & Weilacher

[57] ABSTRACT

An arc spray metallizing gun is provided with electrical conductors which are cooled by circulating a stream of coolant liquid along the length of the conductors. The wire feed mechanism includes a motor which has a shaft carrying two drive gears. One drive gear is engaged with a driven gear connected to a first wire feed wheel, and the other drive gear is connected to a driven gear connected to a second wire feed wheel. The driven gears are located on opposite sides of the shaft, and the teeth on the two drive gears face in opposite axial directions on the shaft so that the driven gears and the feed wheels connected thereto are all rotated in directions which drive the wires forwardly in convergent wire guides.

13 Claims, 4 Drawing Sheets

FIG 2
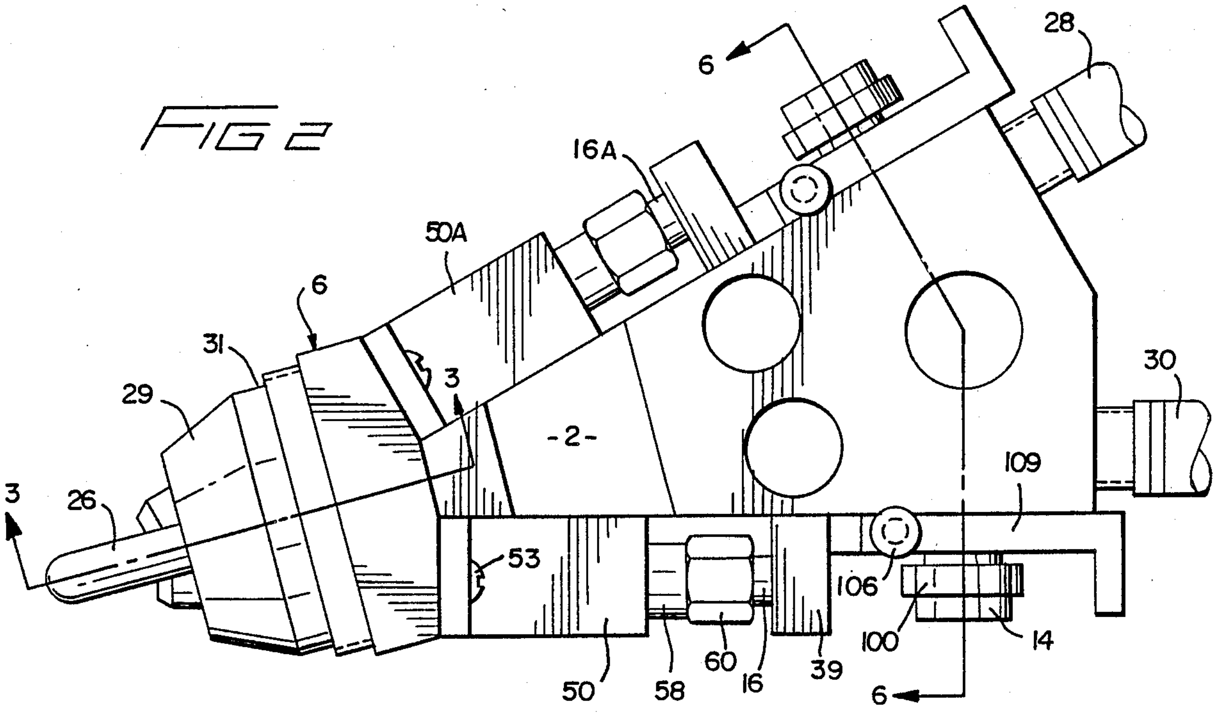
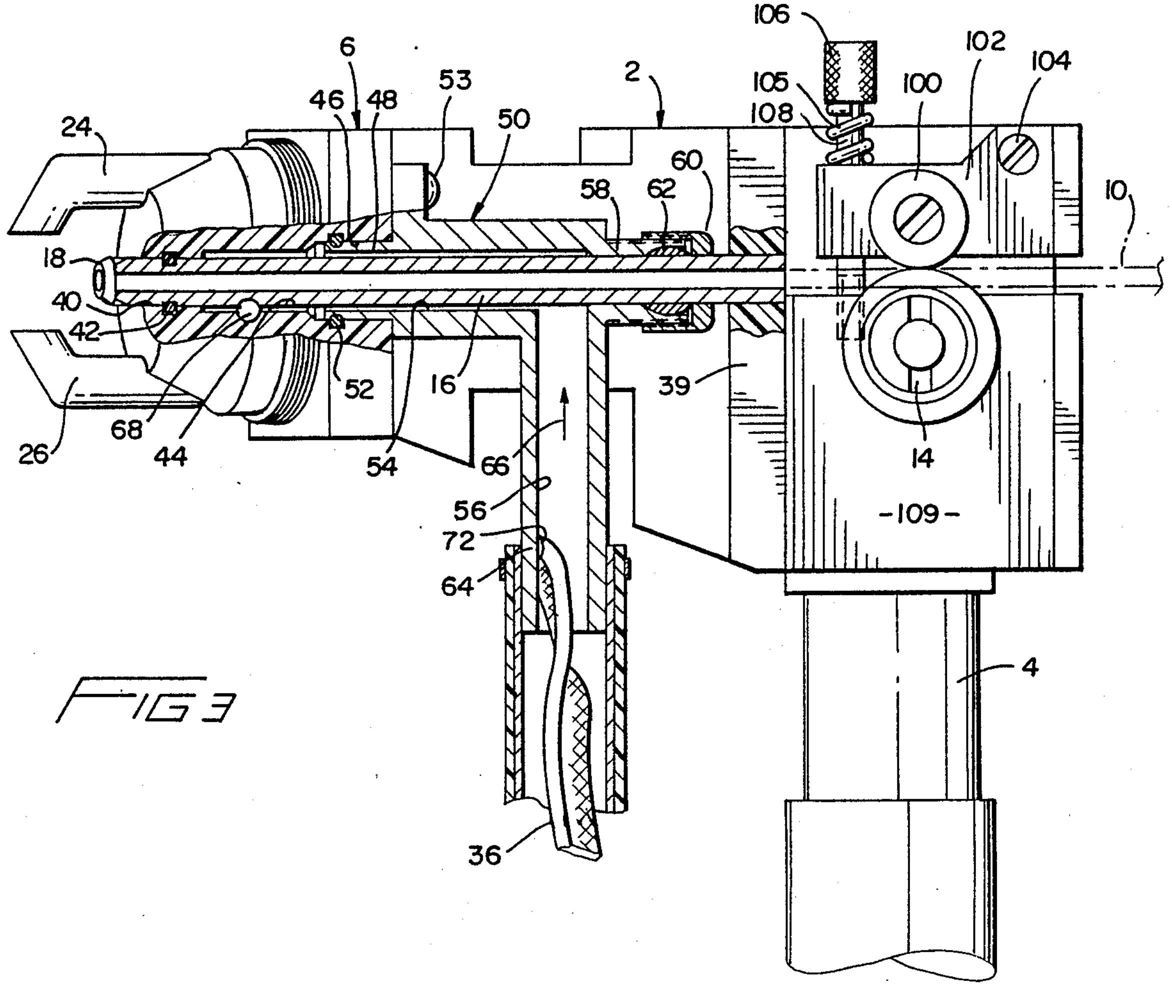
FIG 3

FIG 4
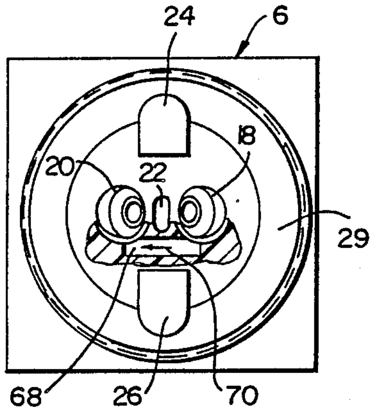
FIG 5
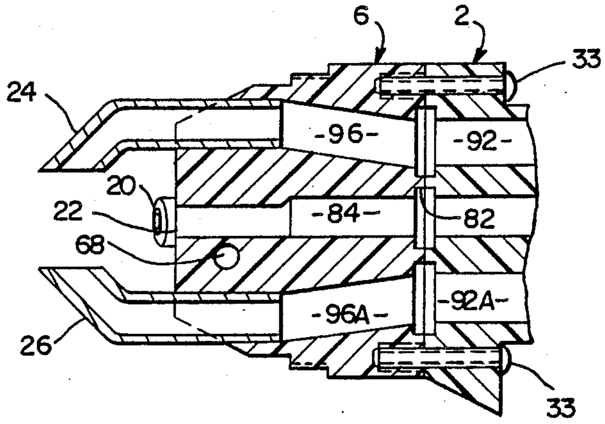
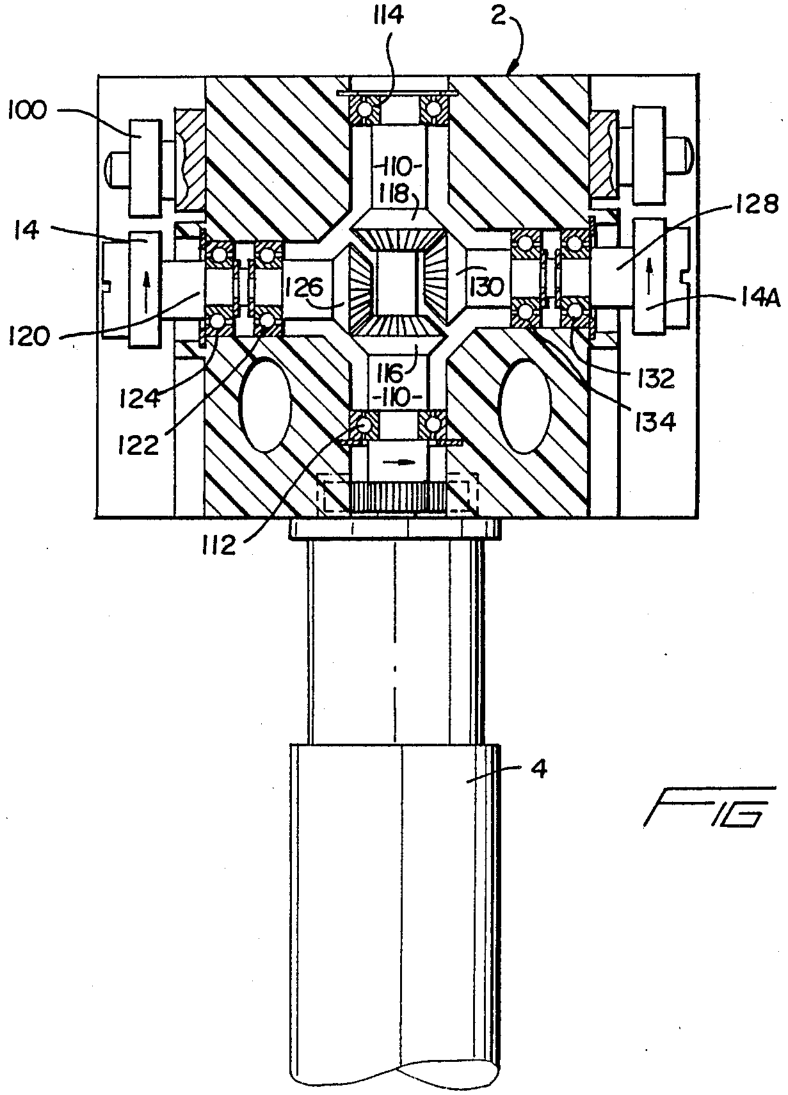
FIG 6

METAL SPRAYING APPARATUS

Reference to Related Application

This is a continuation-in-part U.S. Pat. application No. 07/066,173, filed June 25, 1987, now abandoned. Benefits are also claimed under patent Cooperation Treaty application PCT US88/02140 filed on June 24, 1988.

Background of the Invention

This invention relates to thermal spraying apparatus, and specifically to electric arc spray guns of the type wherein an electric arc is used to melt the forward ends of a pair of metal wires, and a stream of atomizing air is directed into the molten metal to form small droplets and propel them in a forward direction as a spray. Such spray guns are commonly referred to in the art as arc spray guns or, for brevity, "arc guns."

Although arc spray metallizing guns are well known and have been suitable for many purposes, experience has shown that they are not practical for certain tasks. For example, the spray rate of present day arc guns is such that it is too labor-intensive to use them for spraying large structures such as bridges. Metallized spraying of such structures is a very desirable technique since it is possible to spray a zinc coating which will give cathodic protection which is more effective and more durable than conventional painting of such structures.

One object of the invention is to provide an arc spray gun which is suitable for large scale projects and is capable of delivering a higher spray rate than existing devices of this type.

Another object is to provide an arc spray gun which is relatively lightweight and is easily manipulated, yet is also able to deliver a metallizing spray at a high rate.

Another object is to provide an arc spray gun which is effective, relatively uncomplicated and easily maintained.

Summary of the Invention

This invention pertains to improvements in arc spray guns which have wire guide means for guiding at least two metal wires lengthwise along two axes which are mutually convergent in a forward direction, wire feed means for moving the wires forwardly in the wire guides, electrical circuit means for providing an electrical potential difference between the two wires to form an arc which melts the forward ends of the wires, and means for directing a stream of gaseous fluid toward the forward ends of the wires to propel droplets of the molten metal in a forward direction. The electrical circuit means includes an elongated electrical conductor which extends from the gun for connecting the gun to an external power supply.

The first area of improvement to such an arc spray gun is the inclusion of means for cooling the electrical conductor by circulating a stream of coolant liquid along the electrical conductor. A second improvement relates to a gun where guide tubes are located in forwardly convergent bores in an insulating gun head. The walls of the guide tubes are spaced radially from the tubes to provide spaces for coolant fluid around the guide tubes.

Another important feature of the invention, taken together with the cooling arrangement, is that the wires follow unbent linear paths through the gun, thus reducing energy consumption and facilitating high wire velocities. Wire feed rolls have their axes perpendicular relative to the wire guides and at an obtuse angle relative to each other.

Preferably two electrically conductive fittings are affixed to opposite sides of the head. Each of these fittings has an internal coolant passage which is in communication with one of the coolant fluid spaces within the head. The head may have a coolant passage which extends between the coolant fluid spaces so that a stream of coolant fluid may flow serially through the coolant fluid spaces.

It is also preferred to have the guide tubes extend through the conductive fittings and to provide compression fittings which are operable to affix the guide tubes to the conductive fittings. Such compression fittings are releasable to permit longitudinal adjustment movement of the guide tubes, and the compression fittings include cap nuts which are threadedly connected to the conductive fittings.

The wire feed means includes a motor connected to a main drive shaft which has drive gear means mounted thereon for rotation therewith. The drive gear means includes a first set of drive gear teeth and a second set of drive gear teeth. A first wire feed wheel is connected to and driven by a first driven gear which has its teeth engaged with the first set of drive gear teeth. A second wire feed wheel is connected to and driven by a second driven gear which has its teeth engaged with the second set of drive gear teeth. The two driven gears are located on opposite sides of the shaft and the first and second sets of drive gear teeth face in opposite axial directions on the main drive shaft so that the driven gears and their respective feed wheels are rotated in directions which drive the wires forwardly in the wire guide means.

Regarding the wire driving means, it is preferred to have the driven gears and feed wheels rotatable about axes which, in plan view, lie at an obtuse angle relative to each other. Also, it is desirable to arrange these rotational axes so they lie perpendicular to the guide tubes.

Brief Description of the Drawings

FIG. 2 is a plan view of the apparatus of FIG. 1.

FIG. 3 is a partially sectioned elevational view of the gun of FIG. 1.

FIG. 4 is a front view showing only a forward portion of the gun of FIG. 1.

FIG. 5 is a sectional view as seen along the line 5—5 in FIG. 2.

FIG. 6 is a sectional view as seen along the line 6—6 in FIG. 2.

Detailed Description

Figure 1:
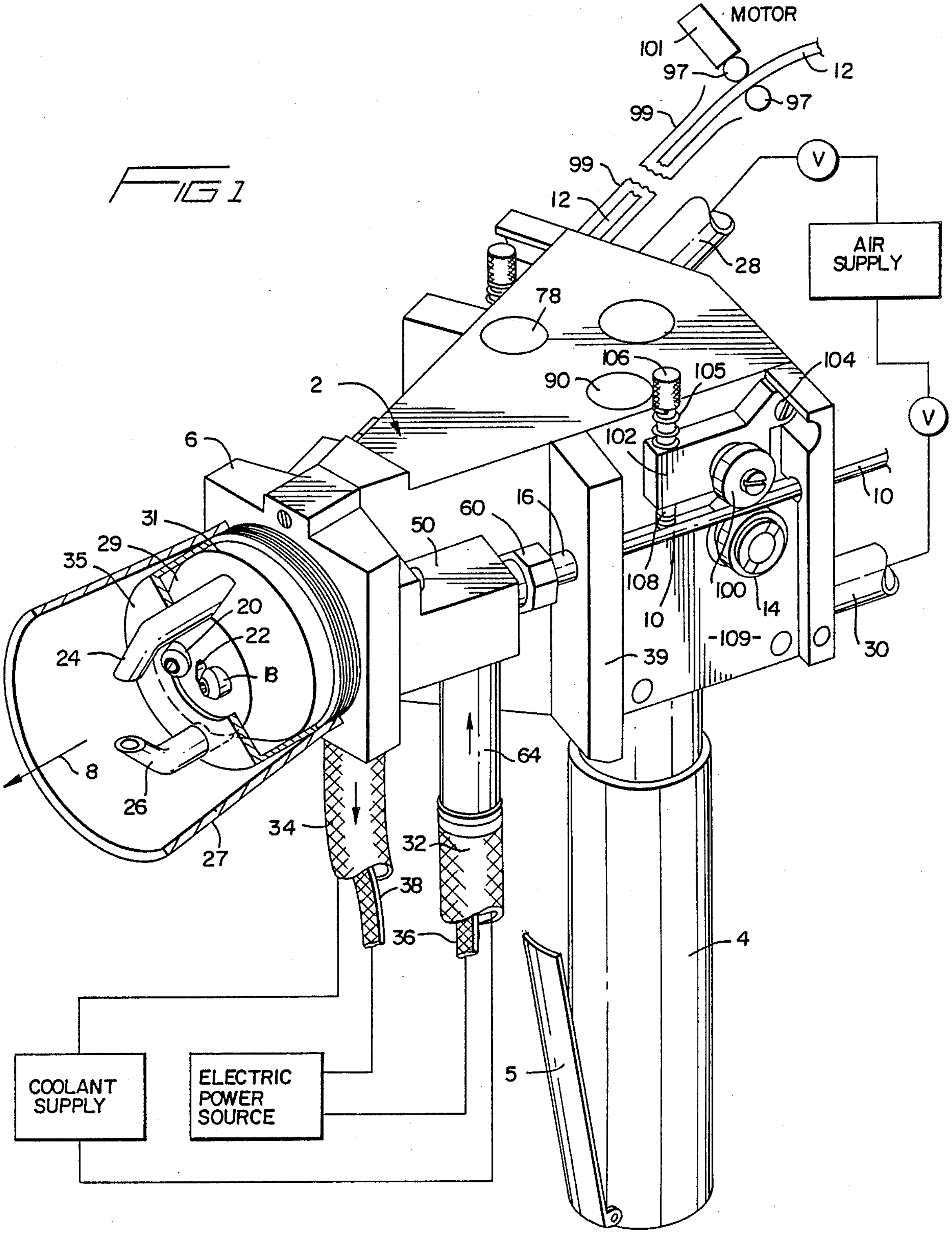
FIG. 1 is a partially sectioned perspective view of a metallizing gun constructed according to the invention.

Referring to FIG. 1, it will be seen that the gun has a main body 2 mounted on the upper end of a handle 4. A conventional hand-operated switch actuator 5 is mounted on the handle to deactivate the apparatus when the operator's grip is released. A head 6 is mounted on the forward end of the body 2 and is arranged so that metal sprayed by the gun is discharged in a forward direction represented by the arrow 8.

Wires 10 and 12 are fed in a forward direction by a pair of feed wheels, one of which is shown at 14, into guide tubes, one of which is shown at 16. The wires pass through the head 6 and emerge at tips 18 and 20 which constitute the forward ends of the guide tubes. The wires are on converging paths and they are maintained at different electrical potentials so that an arc will be formed between the wires to heat them and melt their forward ends. The wire material thus molten is impinged by a high velocity stream of atomizing air from the air outlet 22 at the forward end of the head 6, thus breaking the molten metal into small droplets and propelling them as a spray for deposition on a surface. An airborne stream of molten metal droplets is propelled forwardly until it strikes the surface of the workpiece which is being sprayed. To reduce the risk of eye damage, a shield 27 is mounted on the head 6 in order to surround the area of the electric arc.

The head 6 is formed of an electrically insulating plastic material. It has a forward truncated conical portion 29, a cylindrical portion 31 which is externally threaded, and a rear portion which, as shown in FIG. 5, is attached by screws 33 to the main body 2. As shown in FIG. 1, a cap 35 is removably mounted on an unthreaded section of the cylindrical portion 31, and the shield 27 is threaded onto the portion 31. A pair of spray shaping nozzles 24 and 26 are affixed to the cap 35, and these nozzles direct converging streams of spray-shaping air into and downstream of the droplet-forming region. This produces a fan shaped spray. For convenience of illustration, the cap 35 is not shown in FIGS. 2–5.

Externally of the gun, there is a unit which supplies the fluids and electricity required for proper operation. An atomizing air source is connected to the gun by a conduit 28, and spray-shaping air for the nozzles 24 and 26 is supplied by a conduit 30. A coolant supply unit sends a liquid or gaseous coolant to the gun through a conduit 32, and this unit receives a return flow of the coolant fluid from the conduit 34. A conventional electric power source is connected to a motor in handle 4 by a cord (not shown), and the arc-generating electrical power source is connected to the gun by braided copper conductors 36 and 38 which extend through the coolant conduits 32 and 34.

The means for guiding and feeding the wires is best shown in FIGS. 2, 3 and 6. Referring to FIG. 2, it will be seen that the wires are guided lengthwise along two axes which are mutually convergent in a forward direction so that, in the area of the electric arc, the forward ends of the wire will lie proximate to each other.

FIG. 2, shows that each wire guide tube 16 receives the wire 10 at its rear end and releases the wire at a tip 18 at the forward end of the guide tube. The guide tube extends concentrically through a bore in the head 6, and this bore has sections of three different diameters. The small diameter forward portion 40 of the bore snugly receives the guide tube and is sealed thereagainst by means of an O-ring 42. The intermediate portion 44 of the bore is somewhat larger than the guide tube in order to provide a radial spacing and a cylindrical passage for coolant fluid as will be later described. The large diameter rear portion 46 has a diameter corresponding approximately to the outside diameter of a cylindrical extension 48 of a fitting 50, the functions of which will be subsequently described. An O-ring 52 provides a seal between the bore portion 46 and extension 48.

The fitting 50 is formed of an electrically conductive material such as brass, and it is mounted on the head 6 by a screw 53. The fitting 50 has a horizontal bore 54 which is intersected by a vertical bore 56. The forward portion of bore 54 is larger than the guide tube 16, thus providing a cylindrical space which is an extension of and communicates with the cylindrical coolant fluid passage in the head 6. The rear end of the bore 54 has a diameter approximately equal to the outside diameter of the guide tube 16, and this lies within a fitting portion 58 which is externally threaded to receive the internal threads of a cap nut 60. The principal electrical connection between the fitting 50 and the guide tube 16 is in the area or zone within the fitting portion. Thus, it will be appreciated that the coolant passage around the guide tube is in the area between this electrical connection and the arc zone at the front of the gun. A brass compression ring 62 is located within the cap nut. The compression fitting comprising the cap nut 60 and compression ring 62 is usually tightened to affix the guide tube 16 to the fitting 50. However, loosening of the cap nut 60 releases the compression fitting to permit longitudinal and/or rotational adjustment movement of the guide tube 16. The rear end of the tube 16 is received in an opening formed in a flange 39 on the main body 2.

Although the illustration in FIG. 3 only shows one guide tube 16, it will be understood that the guide tube 16A on the right side of the gun is constructed and mounted in a similar manner.

An important feature of the invention, when combined with the cooling means, is that each wire at the gun moves in an unbent linear path to the arc zone. This will be understood by reference to FIG. 2 where it will be noted that the rotational axes of the feed wheels 14 and 14A, coincident with the section line 6—6, lie at an obtuse angle relative to each other, and they also lie perpendicularly to the linear paths established by the guide tubes 16 and 16A.

The cooling means for the gun includes a fluid circulating unit which is connected to the gun by the supply and return conduits 32 and 34 respectively. As shown in FIG. 2, the supply conduit is affixed to a tube 64 which is integral with the fitting 50. Thus, liquid or other coolant fluid from the supply conduit 32 will flow in the direction of arrow 66 into the cylindrical space which extends around and longitudinally of the guide tube 16. The fluid exits this space via a transverse bore 68 which can also be seen in FIGS. 4 and 5. In FIG. 4, an arrow 70 indicates the direction of coolant fluid movement in this area.

The right side of the gun has a fitting 50A shown in FIG. 2 which is identical to the fitting 50 and also provides a cylindrical fluid passage around the corresponding guide tube 16A. Therefore, the coolant fluid which passes transversely through the bore 68 into the coolant space around the tube 16A then flows rearwardly around the tube 16A until it arrives at the vertical bore which corresponds with the bore 56 shown in FIG. 3. From this point, the coolant fluid flows downwardly into the return conduit 34 shown in FIG. 1 which then carries the fluid to the coolant circulator. The circulating unit can include a heat exchanger which is cooled by air, water, or a refrigeration system.

In addition to cooling the guide tubes in the head portion of the apparatus, the coolant fluid serves the important function of cooling the electrical conductors 36 and 38 which provide the arc-forming electrical potential difference between the tips 18 and 20 and their respective wires. As illustrated in FIGS. 1 and 3, these electrical conductors are elongated braided copper wires and they have a generally rectangular transfer cross section. As shown in FIG. 3, the electrical conductor 36 is electrically connected to the tube 64 of fittings 50 by silver soldering at 72. The coolant is circulated through the conduits 32 and 34 in order to cool the electrical conductors which, if uncooled, would overheat due to the very high current required for high spray rates.

Figure 7:
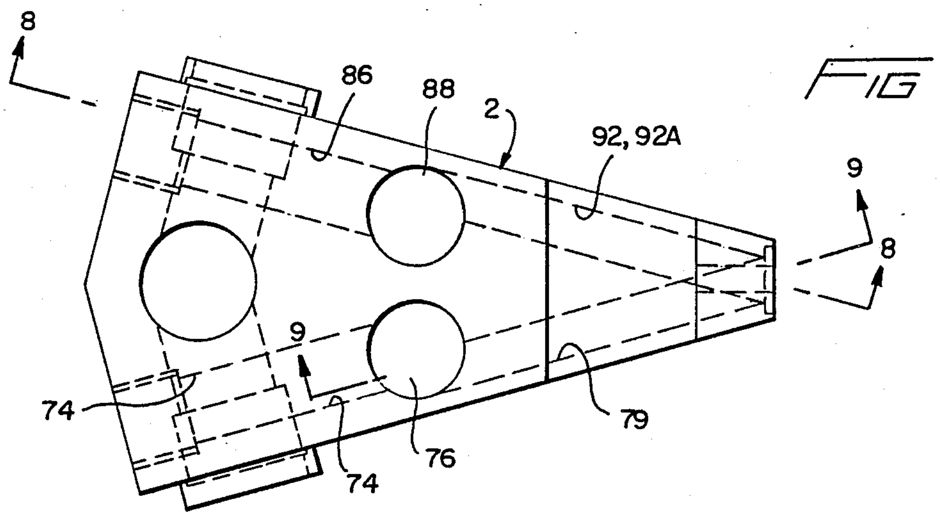
FIG. 7 is a plan view of the insulating body of the gun of FIG. 1.
Figure 9:
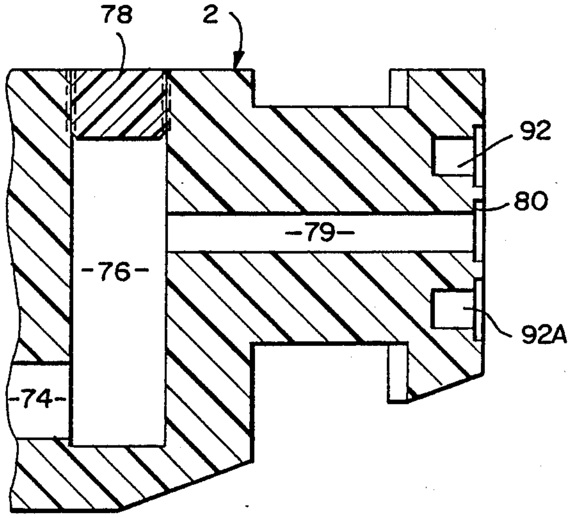
FIG. 9 is a sectional view as seen along the line 9—9 of FIG. 7 to show the passages for atomizing air.

The body 2 and head 6 have a series of internal passages which carry the atomizing air and the spray shaping air to the outlets 22, 24 and 26. The passages for the atomizing air are best shown in FIGS. 5, 7 and 9. Referring to FIGS. 7 and 9, it will be seen that the atomizing air initially moves through a horizontal bore 74 to a vertical bore 76 which has a plug 78 obstructing its upper end, and thence through a horizontal bore 79, the forward end of which terminates at an O-ring seat 80. As shown in FIG. 5, seat 80 aligns with a similar O-ring seat 82 formed in the head 6. From this area, a bore 84 extends forwardly to the atomizing air outlet 22. As shown in FIG. 4, this outlet preferably has an oval shape and it is located centrally between the guide tips 18 and 20.

Figure 8:
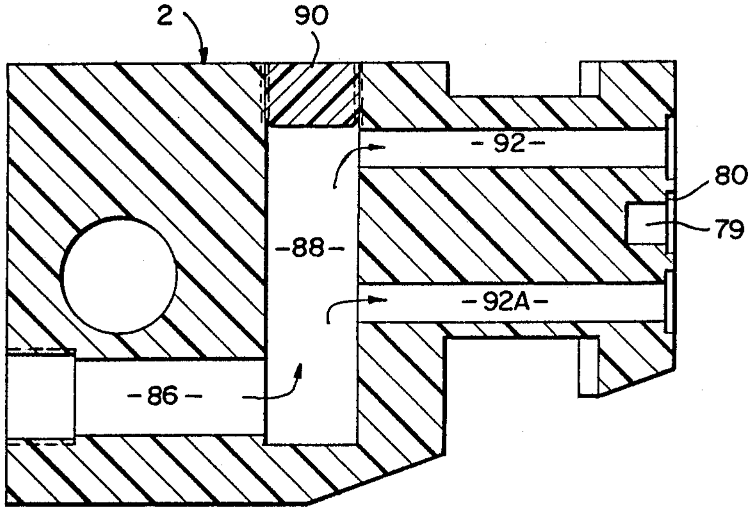
FIG. 8 is a sectional view as seen along the line 8—8 in FIG. 7 to show the passages for spray shaping air.

The passages for the spray shaping air can be seen best in FIGS. 5, 7 and 8. This air passes sequentially through the horizontal bore 86, a vertical bore 88 which is capped by a plug 90, and a pair of horizontal bores 92 and 92A. The air then passes into the diverging bores 96 and 96A which are shown in FIG. 5. Finally, the spray shaping air is carried by the spray-shaping nozzle tubes 24 and 26 which have forwardly inclined mutually convergent axes for shaping the spray which emerges from the gun.

The wire supply is preferably of the push-pull type wherein the wire comes from a stationary supply which is spaced from the spray gun. As diagrammatically shown in FIG. 1, the wire supply has pusher rolls 97 which engage the wires 10 and 12 and drive them toward the gun. A flexible wire guiding conduit 99 has its opposite ends affixed to the wire supply and to the gun so that it acts in some respects like a Boden wire system. When the wire feed rolls 97 connected to motor 101 at the wire supply are operated, the wire is pushed forwardly to the feed rolls 14 which pull the wire and deliver it toward the head. The effect of the pusher rolls is to apply compressive forces to the wires within the wire guiding conduits, and also to apply tensile forces to the conduits 99 themselves. The use of pusher rolls reduces the demands on the wire feeding motor in the gun handle, thus making it possible to use a very lightweight motor in the gun.

On the gun, the wires 10 and 12 are fed along their respective longitudinal axes by two substantially identical mechanisms which are mirror images of each other. In the mechanism shown in FIG. 1, the wire 10 is frictionally engaged between the feed wheel 14 and an idler wheel 100 which is mounted on a swinging plate 102. The plate 102 is pivotally mounted on a screw 104 and it is biased in a clockwise direction by a compression spring 105. The biasing force is adjustable by manually rotating the knurled adjustment knob 106 which is integral with a spring-supporting pin 108 which is threaded into a mounting plate 109 on the body 2. As will be apparent, rotation of the adjustment knob 106 will change the degree of compression of the spring 105, thus changing the loading force which the idler wheel 100 exerts on the wire 10 to hold the wire against the feed wheel 14.

The mechanism for driving the feed wheel 14 and its right side counterpart 14A is shown in FIG. 6. As previously mentioned, a small electric motor is housed within the handle 4. This motor rotationally drives a vertical shaft 110 which is mounted on ball bearing assemblies 112 and 114, and it carries a lower bevel gear 116 and an upper bevel gear 118.

The left feed wheel 14 is mounted on a shaft 120 which is rotationally supported on a pair of ball bearing units 122 and 124. At the right end of the shaft, there is a bevel gear 126 with teeth which mesh with the teeth of the lower bevel gear 116 on the motor-driven shaft 110. Thus, the upper wire-engaging portion of the wheel 14 is rotated in a forward direction to feed the wire through the guide tube and to the fusion area.

The right feed wheel 14A must also be driven so that its upper wire-engaging surface is moving in a forward direction. Such motion is achieved by mounting the feed wheel 14A on a shaft 128 which has, at its left end, a bevel gear 130 with teeth which mesh with the teeth of the upper bevel gear 118. The shaft 128 is rotationally supported by the ball bearing units 132 and 134. As can be seen by the orientation of the section line in FIG. 2, the rotational axes of the shafts 120 and 128 are at an obtuse angle relative to each other. These rotational axes are perpendicular to their respective wires and guide tubes.

Inasmuch as the bevel gears 126 and 130 associated with the feed wheels 14 and 14A are meshed with gears 116 and 118 which face in opposite axial directions on the shaft 110, the oppositely extending shafts 120 and 128 will rotate in the same direction so that the wires will both be fed forwardly through their respective guide tubes.

The wire-engaging circumferences of the feed wheels 14 and 14A are electrically insulated from the shafts 120 and 128. Such insulation may be provided, for example, by providing the wheels with internally threaded plastic hubs which are threaded onto the respective shafts. Metal rings which contact the wires are affixed to the plastic hubs.

Although the preceding description has referred to FIGS. 1–9 as describing a single embodiment, it will be noted that the gun shown in FIG. 1 differs slightly from the version shown in FIGS. 2–9. For example, in the FIG. 1 embodiment, the upper surface of head 6 has a raised central portion, the body 2 has an upper surface which is flat except for a raised forward portion, and the swing plate has a rear extension which receives the pivot screw 104.

Figure 10:
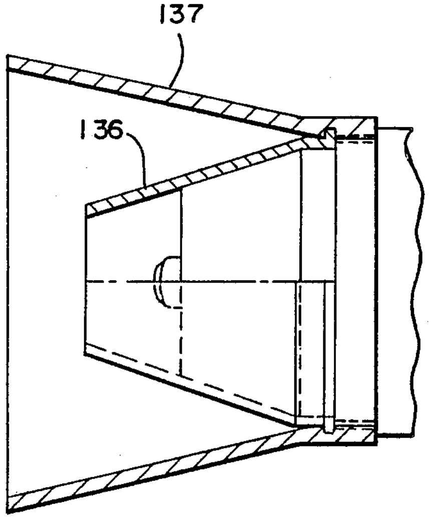
FIG. 10 is a sectional view of a modified type of spray shaping and shielding means for a metallizing gun.

When a smaller target area is being sprayed or when a smoother finish is desired, the cone 27, cap 35 and spray-shaping nozzles 24 and 26 are removed from the head and replaced by an assembly, shown in FIG. 10, which includes a cone 136 and a shield 137. Air is introduced into the cone from the bores 96 and 96A. The resulting spray strikes a smaller area than the fan shaped spray, and a smoother coating is produced. The cone 136 has a circumferentially protruding flange at its base which is received in a corresponding recess on the internal surface of the spray shield 137.

As previously mentioned, the invention is particularly advantageous because it provides a relatively small, easily manipulable gun capable of delivering a very high spray rate which, in some instances, can be as much as seven to eight times the spray rate normally achieved with existing lightweight handheld guns. By way of example, a gun made according to the present invention weighs less than four and one half pounds. It has a length of approximately eight inches, a height of approximately eight and one half inches including the handle, and a width of about four and one half inches. The conduits 32, 34 and cables 36, 38 are seventy feet long, and water is circulated through the conduits at a rate of two gallons per minute. At the coolant supply, the temperature difference between the incoming and outgoing water is twenty-five degrees C. The electric power source delivered 1400 amperes at 50 volts, making it possible to spray aluminum wire of ⅛ inch diameter at a rate of 80 pounds per hour. The gun is capable of spraying wire having diameters from 1/16 to ⅛ inch, and numerous metal compositions such as aluminum, zinc, steel, bronze, rabbit and other alloys.

Persons familiar with the field of this invention will recognize that it does indeed satisfy the need for a metallizing spray gun capable of a very high spray rate. Additional beneficial features are the convenient and uncomplicated means for feeding the wires and for supplying the head with atomizing air and spray-shaping air.

It will be evident that the invention may take many forms other than the specific embodiments disclosed herein. Therefore, it is emphasized that the invention is not limited solely to the disclosed embodiment but is embracing of variations and modifications thereto which fall within the spirit of the following claims.

I claim:

1. A gun for spraying metal in a forward direction, comprising,
   a head formed of electrical insulating material, said head having a pair of bores extending therethrough,
   two electrically conductive guide tubes received in said bores, said guide tubes being operable as wire guide means for guiding at least two metal wires lengthwise along two paths which are mutually convergent in a forward direction, whereby forward ends of the wires are proximate to each other,
   wire feed means for moving said wires forwardly in said wire guide tubes,
   said wire guide tubes and wire feed means being arranged to guide and feed the wires in unbent linear paths in the gun, said wire feed means including feed rolls mounted on the gun in proximity to the guide tubes, said feed rolls engaging the wires and feeding them forwardly in said wire guide tubes, said feed rolls being rotatable about axes of rotation which are substantially perpendicular to said linear paths of the wires in the gun,
   electrical circuit means for providing an electrical potential difference between the two wires to form an arc which extends between the two wires to melt the forward ends of the wires in an arc zone, said electrical circuit means including said wire guide tubes and an electrical connection means which connect an elongated electrical conductor to a connection zone on the wire guide tubes,
   means for directing a stream of gaseous fluid toward the forward ends of the wires to propel droplets of the molten metal in a forward direction,
   said bores in the head having walls which are spaced radially from said tubes to provide spaces for coolant liquid around said guide tubes, said spaces being located between the connection means and the arc zone,
   said spaces having forward ends where the guide tubes are sealed to the head, coolant inlet and outlet openings which are spaced apart axially in said coolant spaces for admitting coolant fluid to and discharging coolant fluid from said coolant spaces, means for moving a coolant liquid through said coolant space, said guide tubes having external walls which are exposed to said coolant spaces so as to provide for heat transfer from said guide tubes to the coolant liquid.

2. A spray gun according to claim 1 wherein said head has a coolant passage which extends between said spaces for coolant fluid.

3. A spray gun according to claim 1 wherein the electrical circuit means includes two electrically conductive members which are affixed to said head, each of said conductive members having an internal coolant passage which is in communication with one of said spaces for coolant fluid.

4. A spray gun according to claim 3 wherein the guide tubes extend through said conductive members.

5. A spray gun according to claim 4 having compression fitting means which are operable to affix said guide tubes to said conductive members, said compression fitting means being releasable to permit adjustment movement of said guide tubes, said compression fitting means including cap nuts threadedly connected to said conductive members.

6. A spray gun according to claim 1 in combination with a wire supply means which is space from the spray gun, said wire supply means including pusher roll means for engaging the wires and driving them toward the gun.

7. A gun for spraying metal in a forward direction, comprising,
   a head formed of electrical insulating material and having two bores extending therethrough,
   wire guide means including two electrically conducting guide tubes which are received in said bores for guiding at least two metal wires lengthwise along two axes which are mutually convergent in a forward direction, whereby forward ends of the wires are proximate to each other, said bores having walls which are spaced radially from said tubes to provide coolant spaces around said guide tubes,
   wire feed means for moving said wires forwardly in said wire guide means,
   electrical circuit means for providing an electrical potential difference between the two wires to form an arc which melts the forward ends of the wires in an arc zone, said electrical circuit means including two electrically conductive guide tubes which are affixed to said head, said guide tubes extending through said conductive members, each of said conductive members having an internal coolant passage which is in communication with one of said spaces for coolant fluid, compression fitting means which affix said guide tubes to said conductive members, said compression fitting means being releasable to permit adjustment movement of said guide tubes, said compression fitting means including cap nuts threadedly connected to said conductive members, means for directing a stream of gaseous fluid toward the forward ends of the wires to propel droplets of the molten metal in a forward direction, said electrical circuit means including an elongated electrical conductive which extends form the gun for connecting the gun to an external electrical power supply, cooling means for cooling said electrical conductor, said cooling means including means for circulating a stream of coolant liquid along said electrical conductor.

8. A gun for spraying metal in a forward direction, comprising, wire guide means for guiding at least two metal wires lengthwise along two axes which are mutually convergent in a forward direction, whereby forward ends of the wires are proximate to each other, wire feed means for moving said wires forwardly in said wire guide means, said wire feed means including:

a motor mounted on said gun, said motor having a shaft which has drive gear means mounted thereon for rotation therewith, said drive gear means including a first set of drive gear teeth and a second set of drive gear teeth, a first driven gear having teeth engaged with said first set of drive gear teeth, a first wire feed wheel operatively connected to and driven by said first driven gear, a second driven gear having teeth engaged with said second set of drive gear teeth, a second wire feed wheel operatively connected to and driven by said second driven gear, said first and second driven gear being located on opposite sides of said shaft, said first and second sets of drive gear teeth facing in opposite axial directions on said shaft, whereby the driven gears and the feed wheels connected thereto are all rotated in directions which drive the wires forwardly in the wire guide means;

electrical circuit means for providing an electrical potential difference between the two wires to form an arc which melts the forward ends of the wires in an arc zone, means for directing a stream of gaseous fluid toward the forward ends of the wires to propel droplets of the molten metal in a forward direction, said electrical circuit means including an elongated electrical conductor which extends from the gun for connecting the gun to an external electrical power supply, cooling means for cooling said electrical conductor, said cooling means including means for circulating a stream of coolant liquid along said electrical conductor.

9. A spray gun according to claim 8 wherein the driven gears and the feed wheels connected thereto are rotatable about rotational axes which, in plan view, lie at an obtuse angle relative to each other.

10. A spray gun according to claim 9, wherein said rotational axes are perpendicular to said guide tubes.

11. A gun for spraying metal in a forward direction, comprising, wire guide means for guiding at least two metal wires lengthwise along two axes which are mutually convergent in a forward direction, whereby forward ends of the wires are proximate to each other, wire feed means for moving said wires forwardly in said wire guide means, electrical circuit means for providing an electrical potential difference between the two wires to form an arc which melts the forward ends of the wires in an arc zone, means for directing a stream of gaseous fluid toward the forward ends of the wires to propel droplets of the molten metal in a forward direction, said electrical circuit means including an elongated electrical conductor which extends from the gun for connecting the gun to an external electrical power supply, two electrically conductive members which are insulated from each other, said wire guide means including a pair of guide tubes, each of said guide tubes extending through and connected to one of the electrically conductive members, compression fitting means which are operable to affix said guide tubes to said conductive members, said compression fitting means being releasable to permit adjustment movement of said guide tubes, said compression fitting means including cap nuts threadedly connected to said conductive members, cooling means for cooling said electrical conductor, said cooling means including means for circulating a stream of coolant liquid along said electrical conductor.

12. A spray gun according to claim 1 wherein the axes of rotation lie at an obtuse angle relative to each other.

13. A spray gun according to claim 2 wherein the guide tubes have forward ends which are no more than about 2 cm. from the forward ends of the coolant spaces.

* * * * *